US010017122B2

(12) United States Patent
Hirota et al.

(10) Patent No.: US 10,017,122 B2
(45) Date of Patent: Jul. 10, 2018

(54) VEHICLE STORAGE COMPARTMENT WITH REINFORCED MOUNTING STRUCTURE

(71) Applicant: Calsonic Kansei North America, Inc., Farmington Hills, MI (US)

(72) Inventors: Toshiyuki Hirota, Aguascalientes (MX); Alan Rafael Belmares, Aguascalientes (MX)

(73) Assignee: CALSONIC KANSEI NORTH AMERICA, INC., Farmington Hills, MI (US)

( * ) Notice: Subject to any disclaimer, the term of this patent is extended or adjusted under 35 U.S.C. 154(b) by 58 days.

(21) Appl. No.: 15/290,878

(22) Filed: Oct. 11, 2016

(65) Prior Publication Data

US 2018/0099617 A1  Apr. 12, 2018

(51) Int. Cl.
| | |
|---|---|
| *B60R 7/06* | (2006.01) |
| *B60R 11/02* | (2006.01) |
| *B60R 7/04* | (2006.01) |
| *B60R 11/00* | (2006.01) |

(52) U.S. Cl.
CPC .................. *B60R 7/06* (2013.01); *B60R 7/04* (2013.01); *B60R 11/0241* (2013.01); *B60R 11/0258* (2013.01); *B60R 2011/0005* (2013.01); *B60R 2011/0007* (2013.01); *B60R 2011/027* (2013.01)

(58) Field of Classification Search
CPC ......... B60R 7/04; B60R 7/06; B60R 11/0241; B60R 11/0258
USPC .......................... 296/24.34, 37.1, 37.8, 37.12
See application file for complete search history.

(56) References Cited

U.S. PATENT DOCUMENTS

| | | | | |
|---|---|---|---|---|
| 6,152,512 A | * | 11/2000 | Brown ....................... | B60R 7/06 296/37.12 |
| 6,598,925 B2 | * | 7/2003 | Sawatani ................... | B60R 7/04 296/37.1 |

FOREIGN PATENT DOCUMENTS

| | | | | |
|---|---|---|---|---|
| JP | 63-201856 | 12/1988 | | |
| WO | WO-2008043563 A1 | * | 4/2008 | ............... B60R 7/06 |

* cited by examiner

*Primary Examiner* — Jason S Daniels

(74) *Attorney, Agent, or Firm* — Foley & Lardner LLP

(57) ABSTRACT

A vehicle storage compartment includes a housing having a forward end, a rear end, upper and lower surfaces, and side walls, the rear end defining an opening. The compartment further includes a flange extending away from and substantially perpendicular to a side wall, and a plurality of ribs extending away from and substantially perpendicular to the side wall and the flange. The housing, flange, and plurality of ribs are integrally formed.

18 Claims, 5 Drawing Sheets

VEHICLE STORAGE COMPARTMENT WITH REINFORCED MOUNTING STRUCTURE

BACKGROUND

The present application relates generally to the field of vehicle storage compartments. Specifically, the present application relates to a storage compartment with an integrated, reinforced mounting structure.

Conventionally, a plastic storage compartment may be coupled to a vehicle cluster (e.g., console, dashboard, etc.) with a metal bracket. The bracket is generally formed from metal because a plastic bracket alone may not be sufficient to withstand loads applied to the compartment without being damaged. However, the addition of the metal bracket increases the weight and complexity of installing the compartment in the vehicle cluster, ultimately increasing the cost of production. Accordingly, it would be advantageous to provide an improved storage compartment for use within the vehicle that overcomes these issues.

SUMMARY

One embodiment relates to a vehicle storage compartment, including a housing having a forward end, a rear end, upper and lower surfaces, and side walls, the rear end defining an opening. The compartment further includes a flange extending away from and substantially perpendicular to a side wall, and a plurality of ribs extending away from and substantially perpendicular to the side wall and the flange. The housing, flange, and plurality of ribs are integrally formed.

Another embodiment relates to a vehicle storage compartment assembly, including a compartment, having a housing having a forward end, a rear end, upper and lower surfaces, and side walls, the rear end defining an opening. The compartment further includes a flange extending away from and substantially perpendicular to a side wall, and a plurality of ribs extending away from and substantially perpendicular to the side wall and the flange. The housing, flange, and plurality of ribs are integrally formed. The assembly further includes a cover configured to couple to the compartment, the cover defining a cover opening having a profile substantially the same as the opening of the compartment.

DETAILED DESCRIPTION

Referring to the FIGURES generally, a vehicle storage compartment is shown according to an exemplary embodiment. The storage compartment includes integrally formed flanges for coupling the storage compartment to a vehicle cluster. The flanges are reinforced with ribs to provide for additional torsional strength for withstanding loads on the storage compartment.

Figure 1:
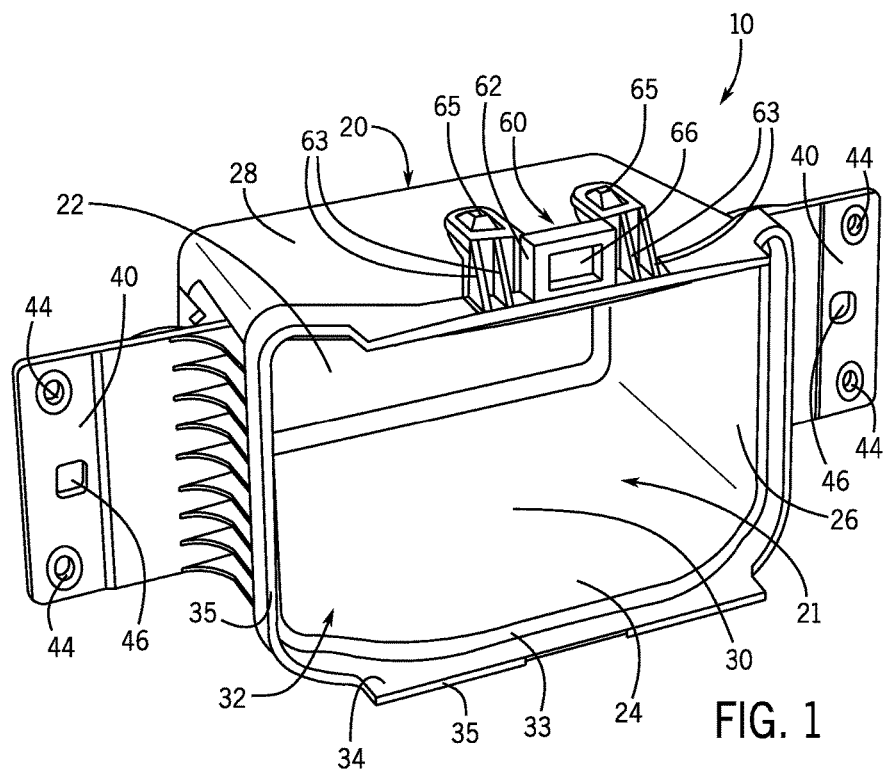
FIG. 1 is a rear perspective view of a vehicle storage compartment, according to an exemplary embodiment.
Figure 2:
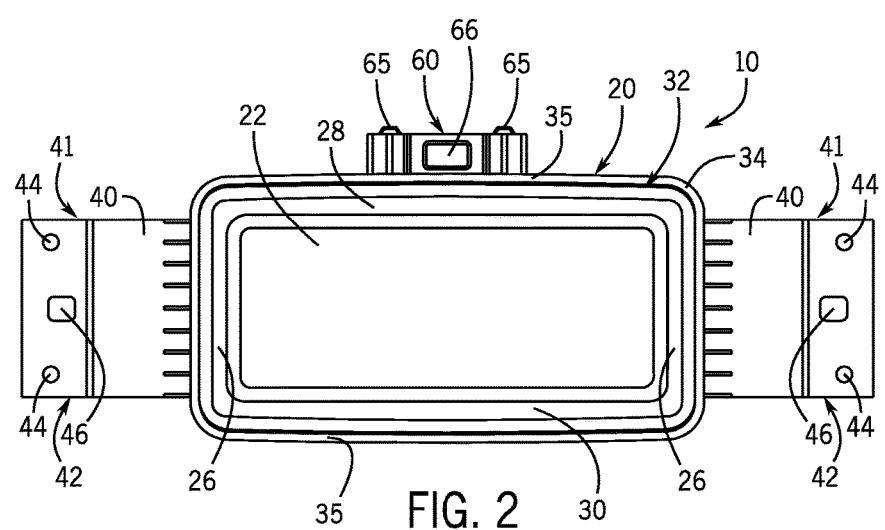
FIG. 2 is a rear elevation view of the compartment of FIG. 1.

Referring to FIG. 1, a vehicle storage compartment 10 (i.e., container, bin, cubby, pocket, etc.) is shown according to an exemplary embodiment. The compartment 10 defines a housing 20 having a forward end 22 (i.e., an end that faces toward the forward or front of a vehicle when installed), an opposing rear end 24 (i.e., an end that faces toward the passenger compartment and rear of the vehicle when installed, such that the rear end may be accessed by a passenger within the vehicle), side walls 26, an upper surface 28, and a lower surface 30. For purposes of the present disclosure as it relates to the vehicle storage compartment 10, the terms "forward" or "front" (or similar terms) refer to a direction extending toward the front of a vehicle, while the terms "rear" or "back" (or similar terms) refer to a direction extending toward the rear of the vehicle. The rear end 24 defines an opening 32 (i.e., compartment opening, mouth, etc.) configured to provide access therethrough to an interior 21 of the housing 20. A rear edge 33 is defined by the opening 32. The rear edge 33 at each of the upper and lower surfaces 28, 30 extends further away from the forward end 22 than at the side walls 26, forming a non-planar contour. As shown in FIGS. 1 and 2, the interior 21 of the housing 20, which is defined by the upper and lower surfaces 28, 30 and the side walls 26, defines a substantially rectangular profile, although according to other exemplary embodiments, the housing 20 may define other shapes (e.g., square, hexagonal, elliptical, circular, etc.). The housing 20 may form a bin in a vehicle cluster (i.e., dashboard, panel, console, etc.) for storing items (e.g., a phone, GPS device, garage opener, etc.) for an occupant of a vehicle. According to another exemplary embodiment, the housing 20 may be configured to receive and house a vehicle system (e.g., HVAC controls, entertainment unit, towing controls, etc.).

While the compartment 10 is configured to be installed in the vehicle cluster, according to other exemplary embodiments, the compartment 10 may be disposed in other locations (e.g., a trunk) within the vehicle. The flanges 40 may be configured to couple to other structures in the vehicle to secure the compartment 10 in the other locations. According to another exemplary embodiment, the compartment 10 may be oriented in other directions to retain items therein. For example, the side walls 26 of the housing may extend substantially laterally in the vehicle and the upper and lower surfaces 28, 30 may extend substantially vertically in the vehicle.

A lip 34 extends from the opening 32, away from the forward end 22 of the housing 20. The lip 34 is disposed on an external surface of the housing 20, such that the rear edge 33 of the housing 20 is exposed and configured to engage another structure (e.g., a cover). As shown in FIG. 1, the lip 34 extends further from the opening 32 at the upper and lower surfaces 28, 30 than at the side walls 26. While FIG. 1 shows the lip 34 extending from substantially the entire opening 32, according to other exemplary embodiments, the lip 34 may extend from only a portion of the opening 32 or the housing 20 may include more than one lip 34 extending from different portions of the opening 32.

Figure 4:
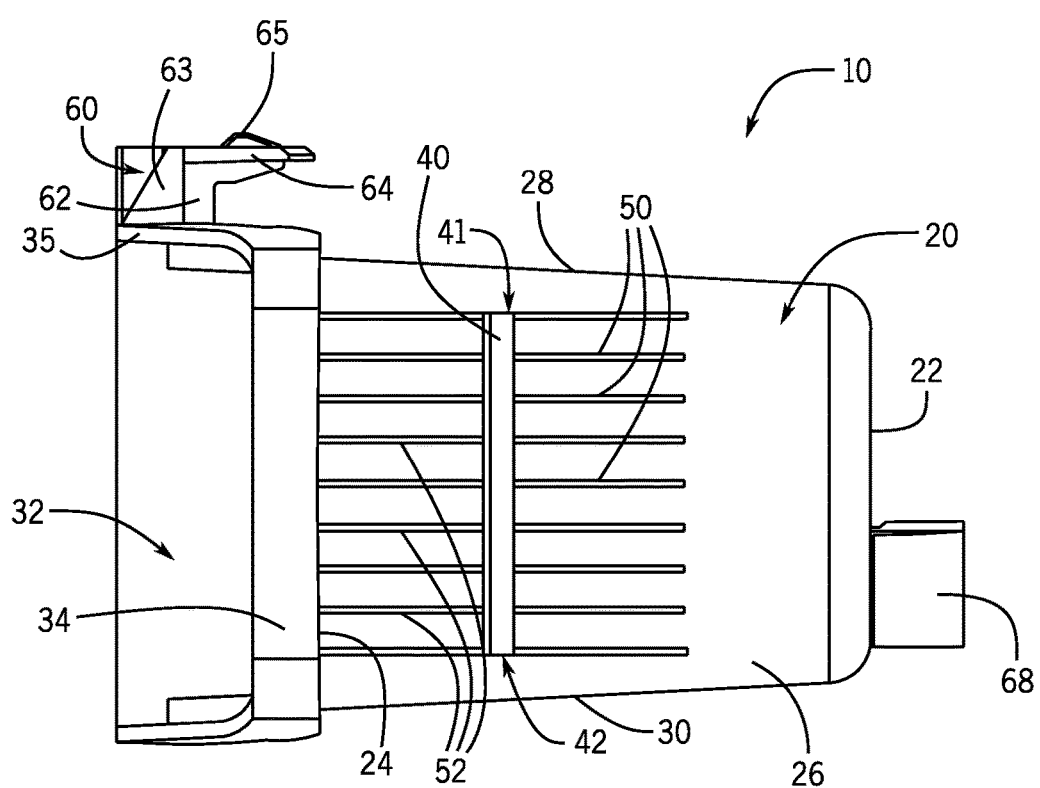
FIG. 4 is a left side elevation view of the compartment of FIG. 1.

Referring to FIGS. 1 and 2, flanges 40 extend substantially perpendicular to and away from each of the side walls 26. Referring to FIG. 4, the flanges 40 are substantially perpendicular to the lower surface 30 and parallel to the forward end 22, such that when the compartment 10 is installed on a vertical wall of the vehicle cluster, the lower surface 30 is substantially horizontal. According to another exemplary embodiment, the flanges 40 may be angularly offset from the forward end 22, such that the lower surface 30, and therefore the compartment 10 is inclined. For example, if an upper end 41 of the flange 40 is positioned closer to the rear end 24 of the housing 20 and a lower end 42 of the flange 40 is positioned closer to the forward end 22 of the housing 20, the rear end 24 may be positioned generally higher (e.g., above) the forward end 22 and the lower surface 30 may be inclined downward from the rear end 24 to the forward end 22. In this configuration, items stored in the housing 20 may be biased toward the forward end 22, aiding in keeping the items within the interior 21 of the housing 20. According to another exemplary embodiment, the flanges 40 may be substantially perpendicular to the lower surface 30, but coupled to the vehicle cluster on an angle, such that the lower surface 30 and therefore the compartment 10 is on an incline relative to the vehicle cluster.

Figure 3:
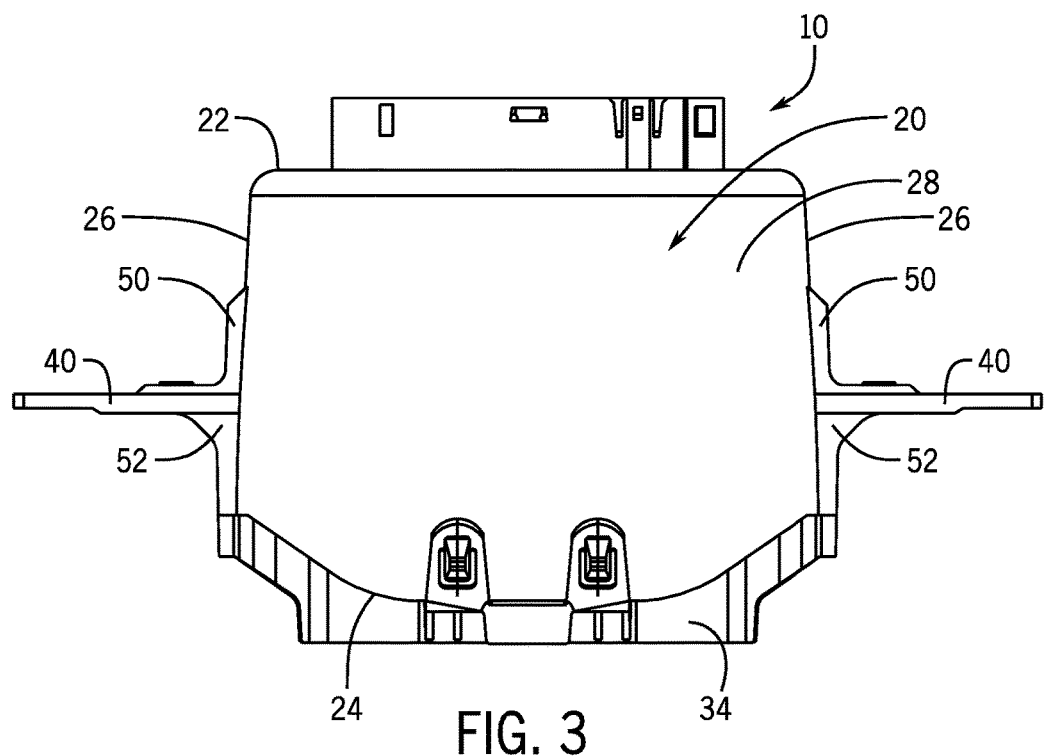
FIG. 3 is a top plan view of the compartment of FIG. 1.

Referring to FIG. 3, the flanges 40 may be positioned on the side walls 26 substantially halfway between the forward end 22 and a rear edge 35 of the lip 34. The position of the flanges 40 is configured to reduce torsional loads on the flanges 40 by the housing 20. With the flanges 40 positioned in the middle of the side walls 26, a portion (e.g., approximately half) of the weight of the housing 20 and its contents is applied forward of the flanges 40 and the other portion (e.g., approximately half) of the weight of the housing 20 and its contents is applied rearward of the flanges 40. The balance of weight on opposing side walls of the flanges 40 reduces or eliminates the bending moment applied by the weight alone of the housing 20 to the flanges 40. Furthermore, when an item is received in the housing 20, the torque applied to the flanges 40 is less than if the flanges 40 were positioned proximate one of the forward or rear ends 22, 24. According to an exemplary embodiment, the flanges 40 may be positioned proximate a center of mass of the compartment 10. According to other exemplary embodiments, the flanges 40 may be disposed at other locations along the side walls 26 between the forward and rear ends 22, 24. For example, the flanges 40 may be disposed partway between the forward end 22 and the rear end 24 of the housing 20. In other words, the flanges 40 may be offset from the forward end 22 and/or the rear end 24. Placement of the flanges 40 away from the rear end 24 allows for more cover 70 shapes without interfering with mounting the compartment 10 to the vehicle cluster.

The flanges 40 may define a plurality of holes 44 configured for coupling the compartment 10 to a vehicle cluster. Each hole 44 may be configured to receive a fastener 45 (e.g., screw, bolt, etc.) therethrough for joining the flange 40 directly to the vehicle cluster, without a separate bracket therebetween. According to other exemplary embodiments, the flanges 40 may engage the vehicle cluster in other ways (e.g., rivet, adhesive, etc.). The flanges 40 may also define one or more openings 46 for coupling a cover 70 to the compartment 10. For example, the cover 70 may include catches configured to be received in corresponding openings 46, forming an interference fit therewith. In this configuration, the cover 70 may be removably coupled to the compartment 10, although according to other exemplary embodiments, the cover 70 may be coupled to the compartment 10 in other ways.

Referring now to FIGS. 3 and 4, a plurality of forward ribs 50 and rear ribs 52 extend between the flanges 40 and the side walls 26 of the housing 20. The forward ribs 50 extend from and substantially perpendicular to each of the flange 40 and the side wall 26. Specifically, the forward ribs 50 extend from the flanges 40 toward the forward end 22 of the housing 20. The rear ribs 52 extend from and substantially perpendicular to each of the flange 40 and the side wall 26. Specifically, the rear ribs 52 extend from the flanges 40 toward the rear end 24 of the housing 20. For example, the forward and rear ribs 50, 52 extend from opposing side walls of the flange 40. As shown in FIGS. 3 and 4, the rear ribs 52 define a length extending substantially fully between the flanges 40 and the lip 34, although according to other exemplary embodiments, the length may be shorter or longer. In this configuration, the torsional strength of the flanges 40 alone as well as the joint between the housing 20 and the flanges 40 is increased. For example, when a weight is applied downward (e.g., from an item inserted into the housing 20), at either the forward end 22 or the rear end 24, a moment is applied orthogonally to the flanges 40 in the same direction as the ribs 50, 52. These ribs 50, 52 prevent the flanges 40 from deforming under the load or from separating (e.g., shearing) the flanges 40 from the housing 20, maintaining the orientation of the compartment 10 in the vehicle.

Proximate the rear end 24 of the housing 20, the rear ribs 52 define a width extending away from the side walls 26 to an outer surface of the lip 34 (e.g., having a same width). According to other exemplary embodiments, the width of the rear ribs 52 may be greater or less than the width of the lip 34. The ribs 50, 52 may form a generally "L" shape between the flange 40 and the side wall 26, although other shapes may be used configured to reduce torsional loads on the flanges 40. The "L" shape reduces interference between the forward rib 50 and other structures and components disposed forward of the vehicle cluster. The "L" shape also may reduce interference between the rear rib 52 and the cover 70. According to an exemplary embodiment, the compartment 10 may be configured to be received in a vehicle cluster assembly as a replacement for a compartment with a separable metal bracket without ribs.

Referring to FIG. 4, each forward rib 50 may have a corresponding rear rib 52 positioned at a same height along the side wall 26 of the housing 20. As shown in FIG. 4, each of the ribs 50, 52 may be substantially parallel to other ribs 50, 52. Vertical spacing between each of the ribs 50, 52 may be consistent between adjacent ribs 50, 52. According to another exemplary embodiment, the vertical spacing between the ribs 50, 52 may vary or be configured to maximize torsional strength at the upper and lower ends 41, 42 of the flanges 40. For example, the ribs 50, 52 may be positioned closer together proximate the upper and lower ends 41, 42 of the flanges 40. Although FIG. 4 shows nine forward ribs 50 and nine rear ribs 52 on each side wall 26, more or fewer forward and rear ribs 50, 52 may be used to provide sufficient torsional strength to the flanges 40.

The compartment 10 is formed as a single component. For example, the compartment 10 may be formed from plastic or other injectable material through injection molding. In this configuration, the housing 20, flanges 40, and ribs 50, 52 are integrally formed from the same material, reducing the assembly time for installing the compartment 10 in the vehicle cluster. According to other exemplary embodiments, the compartment 10 may be formed from other materials or in other ways such that the compartment 10 is integrally formed.

Figure 5:
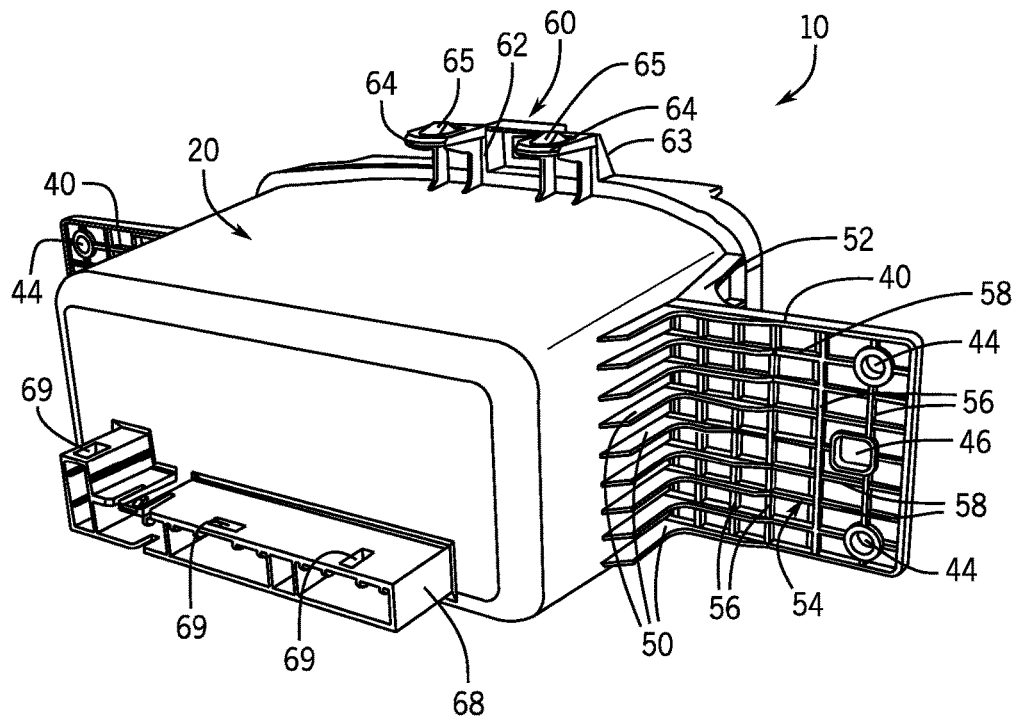
FIG. 5 is a front perspective view of the compartment of FIG. 1.

Referring now to FIG. 5, a web structure 54 is shown according to an exemplary embodiment. The web structure 54 includes a plurality of vertical members 56 and a plurality of lateral members 58 substantially perpendicular to the plurality of vertical member 56. The plurality of vertical and lateral members 56, 58 extend away from and substantially perpendicular to the flanges 40. The web structure 54 is configured to increase the flexing strength of the flange 40, while reducing the thickness thereof. By reducing the thickness, the material used in forming the flanges 40 may be reduced, thereby reducing cost of the compartment 10. Further, in this configuration, twisting and flexing of the flange 40 is reduced.

Each of the lateral members 58 may be positioned at a same height as a corresponding forward or rear rib 50, 52. As shown in FIG. 4, vertical spacing between each of the lateral members 58 may be substantially the same as the vertical spacing between the ribs 50, 52. While the web structure 54 is shown only on a forward side of the flanges 40, according to other exemplary embodiments, the web structure 54 may be defined on a rear side or both sides of the flanges 40.

Referring to FIGS. 4 and 5, the compartment 10 may include a connector 60 (i.e., a clip) for engaging the vehicle cluster or another structure in the vehicle to which the compartment 10 is mounted. The connector 60 is disposed proximate the rear end 24 of the housing. The connector 60 includes a riser 62, extending away from and substantially perpendicular to the lip 34 at the upper surface 28 of the housing 20 at the lip 34, although according to other exemplary embodiments, the connector 60 may be disposed in other positions on the upper surface 28 or on other surfaces (e.g., side walls 26, lower surface 30) of the housing 20. The position of the connector 60 at the upper surface 28 may reduce the torque applied to each of the flanges 40 when an item is received in the housing 20 because the connector 60 absorbs at least a portion of the load that would otherwise be distributed to the flanges 40 if there were no connector 60 present. While FIG. 4 shows one connector 60, according to other exemplary embodiments, more connectors 60 may be incorporated. For example, a second connector 60 may be disposed on the lower surface 30 at the lip 34, mirroring the connector 60 on the upper surface 30. The riser 62 may be strengthened by buttresses 63 extending between and substantially perpendicular to the riser 62 and the lip 34. A projection 64 extends from an upper end of the riser 62, toward the forward end 22 of the housing 20. The projection 64 defines a catch 65 configured to be received in an opening in the vehicle cluster or other mounting structure. The catch 65 is configured to deflect when inserted into the opening and rebound after the projection 64 is fully received therein, forming an interference fit with the opening. In this configuration, the compartment 10 may be removably coupled to the vehicle cluster. According to an exemplary embodiment, the connector 60 may serve as a guide for positioning and securing the compartment 10 to the vehicle cluster. For example, the interaction between the connector 60 and the vehicle cluster may hold the compartment 10 in a fixed position (e.g., support the weight of the compartment 10), facilitating installation of fasteners 45 in the holes 44 of the flanges 40. While FIG. 5 shows two projections 64 extending from the riser 62, according to other exemplary embodiments, more or fewer projections 64 may extend from the riser 62.

Referring to FIGS. 1 and 2, the connector 60 may also define one or more openings 66 for coupling the cover 70 to the compartment 10. For example, the cover 70 may include a catch configured to be received in the corresponding opening 66, forming an interference fit therewith. In this configuration, the cover 70 may be removably coupled to the compartment 10, although according to other exemplary embodiments, the cover 70 may be coupled to the compartment 10 in other ways.

Referring again to FIGS. 4 and 5, the compartment 10 may include a mounting strut 68 (i.e., structure, extension, harness, support, base, etc.) disposed on the forward end 22 of the housing 20. The mounting strut 68 is configured to receive and support components or wiring disposed forward of the vehicle cluster. For example, the mounting strut 68 defines openings 69 configured to receive clips for securing a wire or wires to the mounting strut 68 with an interference fit, although according to other exemplary embodiments, the wires or components may be secured to the mounting strut 68 in other ways. In this configuration, the components and/or wiring may be secured to the vehicle cluster by the compartment 10. While FIG. 5 shows the mounting strut 68 at the forward end 22 of the housing 20, according to other exemplary embodiments, the mounting strut 68 may be positioned at other locations on the housing 20.

According to another exemplary embodiment, when the housing 20 is configured to house a vehicle system, the mounting strut 68 may define a pass-through extending from the mounting strut 68 through the forward end 22 and into the interior 21 of the housing 20, providing access therethrough. The vehicle system may be electrically connected to other systems of the vehicle through the pass-through in the mounting strut 68. For example, wiring may be fed through the pass-through such that the vehicle system can be plugged into a component positioned forward of the vehicle cluster.

Figure 6:
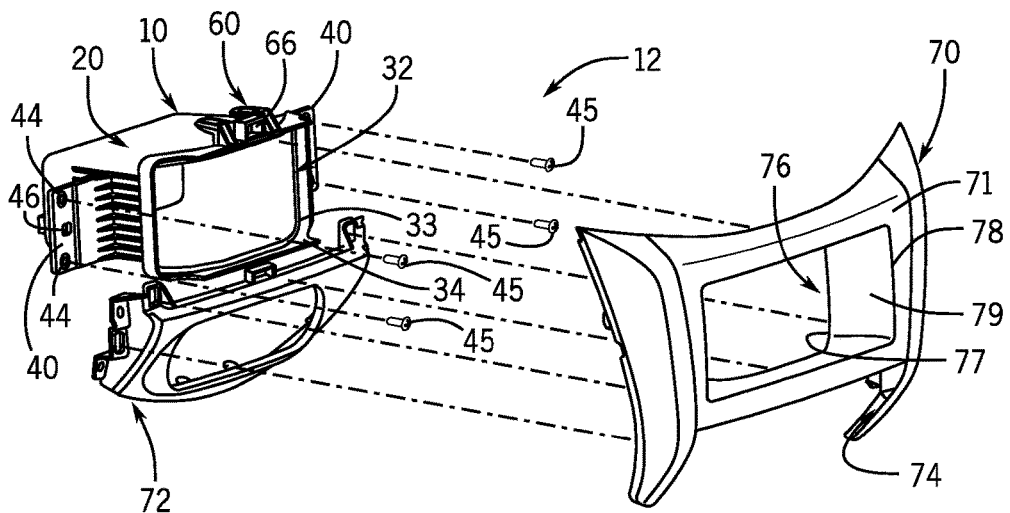
FIG. 6 is a exploded view of a vehicle storage compartment assembly, according to an exemplary embodiment.
Figure 7:
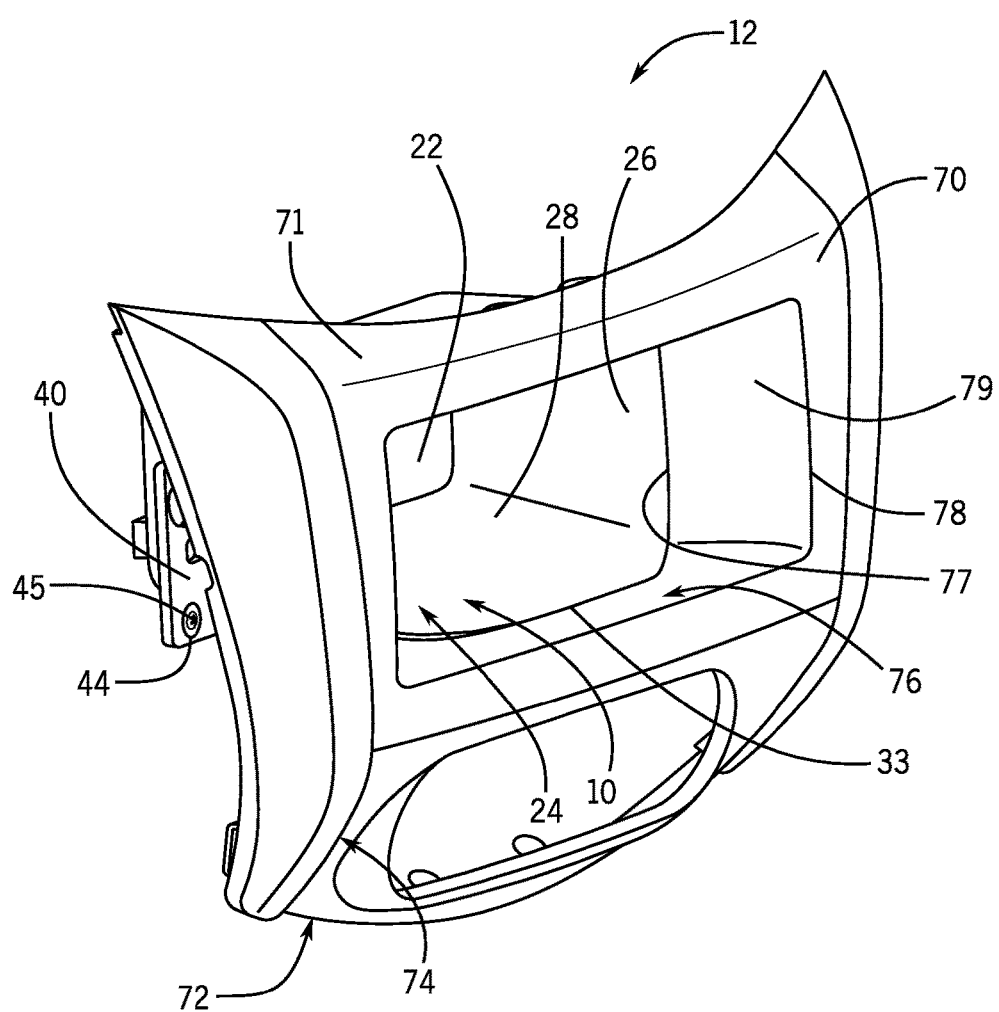
FIG. 7 is an assembled view of the assembly of FIG. 6.

Referring now to FIGS. 6 and 7, a compartment assembly 12 is shown according to an exemplary embodiment. The compartment assembly 12 includes the compartment 10, the cover 70, and a panel 72 disposed below the compartment 10. According to an exemplary embodiment, the panel 72 is configured to house a vehicle system. While FIGS. 6 and 7 show the panel 72 disposed below the compartment 10, according to other exemplary embodiments the panel 72 may be disposed in other positions relative to the compartment 10 and more or fewer panels 72 may be used. According to an exemplary embodiment, each of the compartment 10 and the panel 72 may be coupled to the vehicle cluster or other mounting structure with the fasteners 45.

The cover 70 (i.e., finisher) is configured to be received against the rear end 24 of the housing 20. The cover 70 defines a cutout 74 at a lower end thereof configured to mate with (i.e., receive, nest with, etc.) the panel 72. The shape of the cutout 74 may correspond with the shape of the panel 72, such that a rear surface 71 of the cover 70 forms a substantially continuous surface with the panel 72. According to other exemplary embodiments, the cutout 74 may be positioned in other locations of the cover 70 to correspond with the location of the panel 72. According to another exemplary embodiment, more or fewer cutouts 74 may be formed in the cover 70 to correspond with the number of panels 72 in the compartment assembly 12.

The cover 70 further defines a cover opening 76 extending therethrough configured to mate with the lip 34 of the housing 20. The cover opening 76 has a forward edge 77 and a rear edge 78 and a surface 79 (e.g., curved or arched surface) extending therebetween. The forward edge 77 is configured to correspond with the rear edge 33 of the housing 20. For example, each of the forward edge 77 and the rear edge 33 may define a corresponding non-planar contour and have substantially the same rectangular profile. In this configuration, the forward edge 77 engages the rear edge 33 of the housing 20 substantially all the way around the opening 32. When the cover 70 is installed in the compartment assembly 12, the lip 34 overlaps the forward edge 77 of the cover 70, preventing a gap from forming between the cover opening 76 and the housing 20.

According to an exemplary embodiment, the rear edge 78 of the cover opening 76 may have a substantially rectangular profile. The rear edge 78 may have a width greater than a width of the forward edge 77 and a height greater than a height of the forward edge 77. In this configuration, the size of the cover opening 76 may increase, moving from the forward edge 77 to the rear edge 78. For example, the rear edge 78 may define a larger profile and/or surface area than the forward edge 77. According to other exemplary embodiments, the rear edge 78 may define other shapes or have other dimensions.

The surface 79 is configured to form a continuous, faired (i.e., arched, curved) surface with at least one of the side walls 26, upper surface 28, and lower surface 30 of the housing 20. In this configuration, the housing 20 and the cover opening 76 correspond to form an aesthetically pleasing interface. According to another exemplary embodiment, the surface 79 is substantially co-planar with each of the upper and lower surfaces 28, 30 of the housing 20.

The cover 70 may be removably coupled to the compartment 10 and/or the panel 72. For example the panel 72 may include at least one opening similar to the opening 66 in the compartment 10 for receiving a corresponding catch on the panel. As shown in FIG. 7, when the panel 70 is installed on the compartment 10, the flanges 40 are concealed from view by an occupant situated rear of the compartment assembly 12. The edges of the cover 70 are configured to correspond with other structures defining the vehicle cluster to enclose the space forward of the vehicle cluster from view and/or access from within a passenger cabin.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in sizes, dimensions, structures, shapes and proportions of the various elements, values of parameters, mounting arrangements, use of materials, orientations, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A vehicle storage compartment, comprising:
  a housing having a forward end, a rear end, upper and lower surfaces, and side walls, the rear end defining an opening;
  a flange extending away from substantially perpendicular to a side wall, the flange configured to couple the vehicle storage compartment to a vehicle cluster; and
  a plurality of ribs extending away from and substantially perpendicular to the side wall and the flange; and
  a connector comprising:
  a riser extending away from and substantially perpendicular to at least one of the upper surface, lower surface, or side wall of the housing;
  a projection extending from an upper end of the riser, toward the forward end of the housing; and
  a catch defined by the projection, the catch configured to be received in an opening in a vehicle cluster with an interference fit;
  wherein the housing, flange, and plurality of ribs are integrally formed.

2. The compartment of claim 1, wherein the plurality of ribs includes at least one forward rib and at least rear rib extending from opposing sides of the flange.

3. The compartment of claim 1, wherein the upper and lower surfaces and the side walls define a substantially rectangular profile.

4. The compartment of claim 1, wherein the flange is offset from the rear end of the housing.

5. The compartment of claim 1, wherein at least one flange extends from each side wall of the housing.

6. The compartment of claim 1, wherein the compartment is formed from injection-molded plastic.

7. The compartment of claim 1, wherein the connector is disposed proximate the rear end of the housing; and
  wherein the connector extends away from the upper surface of the housing.

8. The compartment of claim 1, wherein the compartment is inclined when the compartment is installed in a vehicle cluster, such that the forward end of the housing is positioned lower than the rear end of the housing.

9. The compartment of claim 1, wherein the flange further comprises a web structure, the web structure comprising:

a plurality of vertical members extending; and
and a plurality of lateral members substantially perpendicular to the plurality of vertical member;
wherein the plurality of vertical and lateral members extend away from and substantially perpendicular to the flange.

10. A vehicle storage compartment assembly, comprising:
a compartment, comprising:
   a housing having a forward end, a rear end, upper and lower surfaces, and side walls, the rear end defining an opening;
   a flange extending away from and substantially perpendicular to a side wall, the flange configured to couple the vehicle storage compartment to a vehicle cluster; and
   a plurality of ribs extending away from and substantially perpendicular to the side wall and the flange;
   wherein the housing, flange, and plurality of ribs are integrally formed; and
a cover configured to couple to the compartment, the cover defining a cover opening having a profile substantially the same as the opening of the compartment; and
a lip extending from the opening of the compartment, away from the forward end of the housing, the lip disposed on an external surface of the housing;
wherein when the cover is installed on the housing, the lip overlaps a forward edge of the cover opening.

11. The assembly of claim 10, wherein the cover opening defines a rear edge, and a surface extending between the rear edge and the forward edge.

12. The assembly of claim 11, wherein the opening of the compartment defines a rear edge configured to engage the forward edge of the cover opening.

13. The assembly of claim 12, wherein the rear edge at each of the upper and lower surfaces extends further away from the forward end than at the side walls, forming a non-planar contour.

14. The assembly of claim 13, wherein the forward edge of the cover opening forms a complementary contour to that of the rear edge of the compartment.

15. The assembly of claim 12, wherein the side walls of the housing and the surface of the cover opening define a generally faired surface proximate where the rear edge of the compartment engages the forward edge of the opening of the cover.

16. The assembly of claim 11, wherein at least a portion of the surface of the cover opening is substantially curved from the forward edge of the opening to the rear edge of the opening; and
   wherein the rear edge defines a larger profile than the forward edge.

17. The assembly of claim 10, further comprising a connector having a riser extending away from and substantially perpendicular to at least one of the upper surface, lower surface, or side wall of the housing, the riser defining an opening therein configured to receive a corresponding catch on the cover;
   wherein the cover is removably coupled to the compartment when the catch is received in the opening of the riser.

18. A vehicle storage compartment assembly, comprising:
a compartment, comprising:
   a housing having a forward end, a rear end, upper and lower surfaces, and side walls, the rear end defining an opening;
   a flange extending away from and substantially perpendicular to a side wall; and
   a plurality of ribs extending away from and substantially perpendicular to the side wall and the flange;
   wherein the housing, flange, and plurality of ribs are integrally formed;
a cover configured to couple to the compartment, the cover defining a cover opening having a profile substantially the same as the opening of the compartment; and
a connector having a riser extending away from and substantially perpendicular to at least one of the upper surface, lower surface, or side wall of the housing, the riser defining an opening therein configured to receive a corresponding catch on the cover;
wherein the cover is removably coupled to the compartment when the catch is received in the opening of the riser.

* * * * *